(12) United States Patent
Narayanaswamy et al.

(10) Patent No.: US 6,378,480 B2
(45) Date of Patent: Apr. 30, 2002

(54) SONIC WELD IN PLACE SELF-TAPPING SCREW RETAINER

(75) Inventors: Karthik R. Narayanaswamy, Canton; Kevin Arthur Murphy, Sterling Heights; Jon C. Piasecki, Ortonville, all of MI (US); David Jeungsuck Chae, Windsor (CA); Bruce James Harvey, Shelby Township, MI (US)

(73) Assignee: Siemens VDO Automotive, Inc., Windsor (CA)

( * ) Notice: Subject to any disclaimer, the term of this patent is extended or adjusted under 35 U.S.C. 154(b) by 0 days.

(21) Appl. No.: 09/761,998

(22) Filed: Jan. 17, 2001

Related U.S. Application Data

(60) Provisional application No. 60/177,148, filed on Jan. 20, 2000.

(51) Int. Cl.$^7$ ................................................ F16B 17/00
(52) U.S. Cl. ................................................ 123/184.21
(58) Field of Search ...................... 123/184.21–184.61

(56) References Cited

U.S. PATENT DOCUMENTS

| | | | |
|---|---|---|---|
| 2,800,247 A | | 7/1957 | Appleton |
| 4,033,125 A | * | 7/1977 | Inada et al. .................... 60/290 |
| 4,286,552 A | * | 9/1981 | Tsutsumi ............... 123/48 AA |
| 4,288,669 A | * | 9/1981 | Grunert et al. ............. 200/281 |
| 4,311,422 A | * | 1/1982 | Jackovitz ..................... 411/112 |
| 4,512,545 A | * | 4/1985 | Mar .............................. 251/4 |
| 4,611,850 A | * | 9/1986 | Fujikawa .................... 296/201 |
| 5,092,723 A | | 3/1992 | Compton et al. |
| 5,653,200 A | | 8/1997 | Hafner, et al. |
| 5,807,052 A | | 9/1998 | Van Boven, et al. |
| 5,875,758 A | | 3/1999 | Fujita |
| 6,295,905 B1 | * | 10/2001 | Hargis et al. ................. 82/161 |

FOREIGN PATENT DOCUMENTS

| | | |
|---|---|---|
| DE | 8900523 | 4/1989 |
| EP | 0936363 | 8/1999 |

OTHER PUBLICATIONS

PCT International Search Report dated Oct. 18, 2001.

* cited by examiner

*Primary Examiner*—Marguerite McMahon

(57) ABSTRACT

An injection molded screw retainer is employed on an air intake manifold system to retain screws which connect an active system body to a manifold lower assembly. The retainer is substantially "L-shaped" and includes a retaining portion and a substantially perpendicular attachment portion. The retaining portion includes a substantially hemispherical feature positioned substantially over the head of the screw. The oversized attachment portion is inserted within a pocket in the active system body. Ultrasonic energy applied by a sonic welding process slightly melts the outer surface of the attachment portion, creating a weld interference between the attachment portion and the pocket, securing the attachment portion within the pocket.

16 Claims, 1 Drawing Sheet

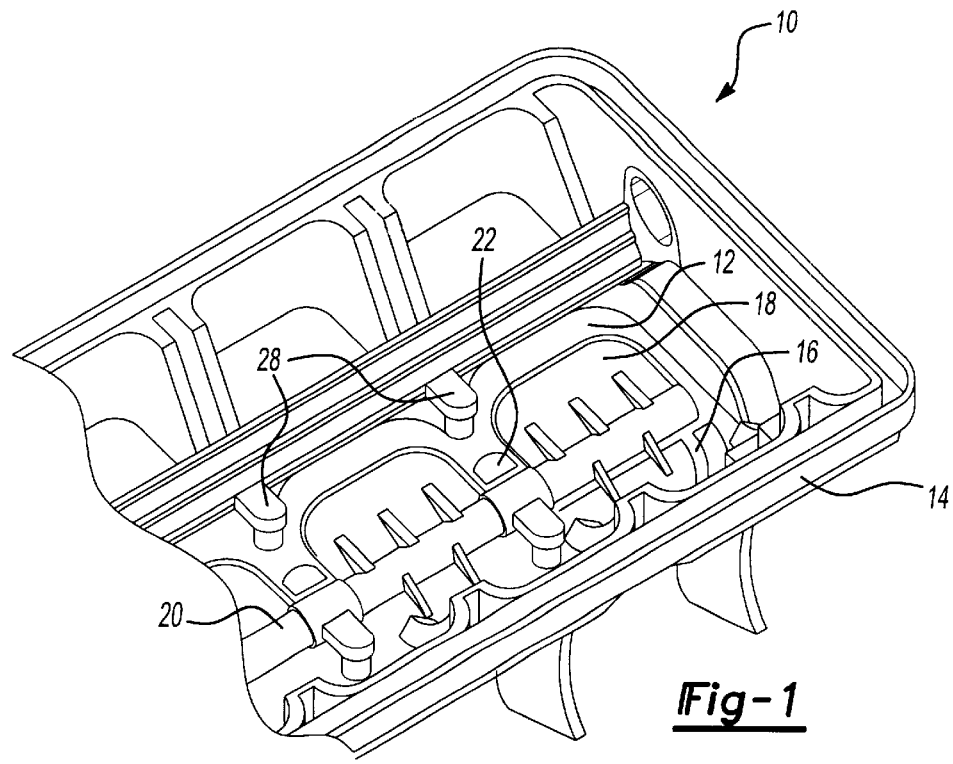
Fig-1
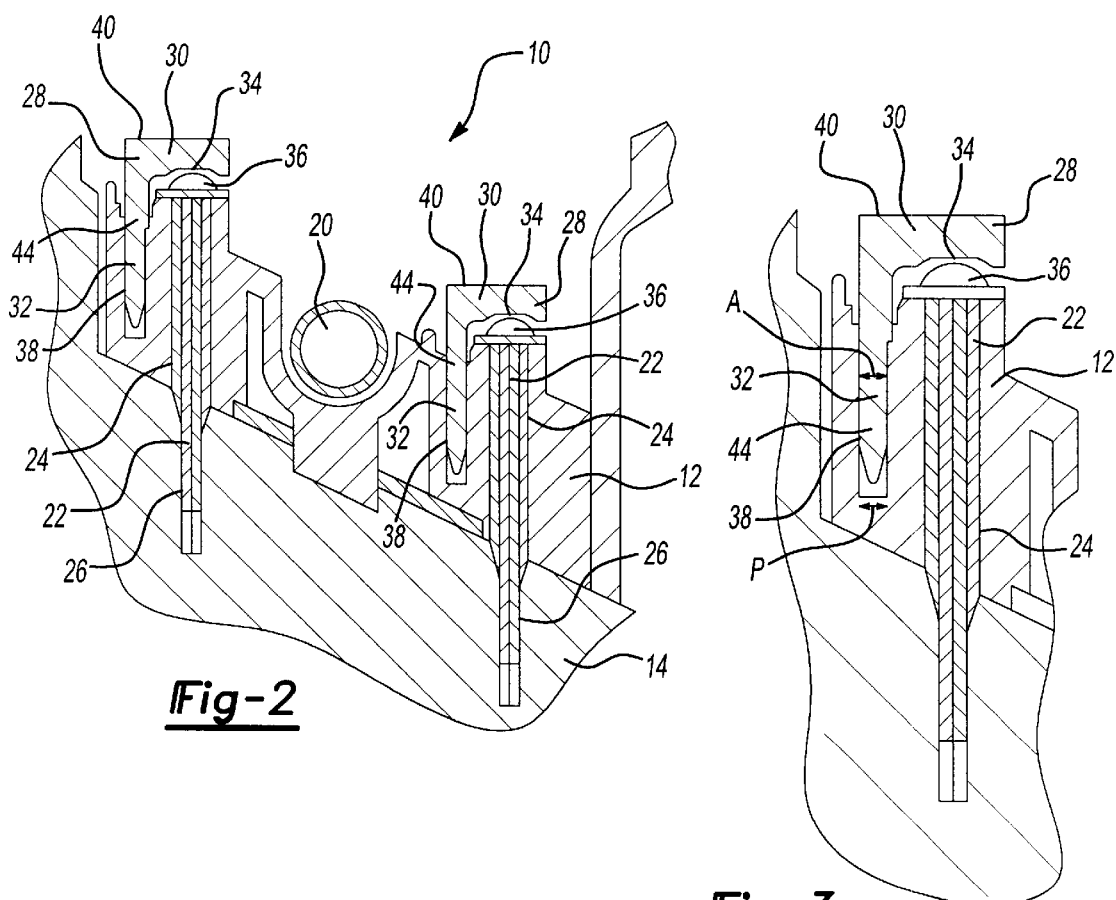
Fig-2
Fig-3

SONIC WELD IN PLACE SELF-TAPPING SCREW RETAINER

This application claims priority from provisional application Ser. No. 60/177,148 filed Jan. 20, 2000.

BACKGROUND OF THE INVENTION

The present invention relates generally to a self-tapping screw retainer utilized on an air intake manifold system.

Self-tapping screws are utilized to assemble and fasten an active system body to a manifold lower assembly of an air intake manifold system. An air intake manifold system brings air into an internal combustion engine at the required temperature and velocity. The screws are designed for fastening the components together under prolonged engine vibration conditions and are exposed to high temperature engine fluids such as gasoline, oil and lubricants. Due to possible operator error or installation equipment malfunction, the screws could loosen and disengage over time due to engine vibrations, possibly resulting in engine failure.

A bonding/adhesive agent is commonly used to retain the screws in the air intake manifold system. However, the bonding agent can weaken due to high temperatures and exposure to gasoline and oil. This can affect the performance of the bonding agent. Additionally, the application of the bonding agent to the screw is unpredictable and may accidentally contact other components proximate to the screws. Finally, it is difficult to determine the strength of the bonding agent both during and after manufacturing.

Hence, there is a need in the art for a self-tapping screw retainer utilized on an air intake manifold system.

SUMMARY OF THE INVENTION

The present invention relates generally to a self-tapping screw retainer utilized on an air intake manifold system.

A substantially "L-shaped" injection molded screw retainer is utilized to retain a self-tapping screw securing an active system body to a manifold lower assembly of an air intake manifold system. The retainer includes a retaining portion and a substantially perpendicular attachment portion.

The retaining portion includes a substantially hemispherical shaped feature sized and shaped to substantially house the head of the self-tapping screw. The retaining portion prevents the screw from loosening and disengaging from the air intake manifold system due to engine vibrations.

The attachment portion of the retainer is secured within a pocket in the active system body by a sonic welding process. The dimension of the attachment portion is approximately 0.15 mm to 0.3 mm larger than the dimension of the pocket. After the oversized attachment portion is inserted into the pocket, ultrasonic energy applied to the retainer to slightly melt the outer surface of the attachment portion. This creates a weld interface between the attachment portion and the pocket, securing the retainer within the pocket.

Accordingly, the present invention provides a self-tapping screw retainer utilized on an air intake manifold system.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 1 illustrates a top view of an air intake manifold system utilizing the screw retainer of the present invention, FIG. 2 illustrates a cross sectional side view of an air intake manifold utilizing the screw retainer of the present invention.

FIG. 3 illustrates a cross sectional side view of the screw retainer of the present invention positioned over a self-tapping screw utilized on an air intake manifold system.

DETAILED DESCRIPTION OF THE PREFERRED EMBODIMENT

FIG. 1 illustrates an air intake manifold system 10. The air intake manifold system 10 includes an active system body 12 attached and secured to a manifold lower assembly 14. The active system body 12 includes a plurality of active system ports 16. A plurality of active system butterfly valves 18 connected to a rotating shaft 20 control the flow of air into the air intake system 10 of an internal combustion engine. The plurality of valves 18 are received within the plurality of active system ports 16, and the rotating shaft 20 rotates the valves 18 to control the degree of opening. In the preferred embodiment, there are four active system valves 18 and four active system ports 16.

The plurality of valves 18 control the flow of air into the internal combustion engine. When more air is to enter the engine, the rotating shaft 20 rotates the plurality of valves 18 away from the active system ports 16 of the active system body 12, allowing more air to enter the internal combustion engine. Conversely, when less air is to be allowed to enter the engine, the rotating shaft 20 rotates to move the plurality of valves 18 towards the active system ports 16 of the active system body 12, allowing less air to enter the internal combustion engine.

As illustrated in FIG. 2, a plurality of self-tapping screws 22 are utilized to assemble and fasten the active system body 12 to the lower manifold assembly 14. The plurality of self-tapping screws 22 are inserted into an aligned active system body aperture 24 and a lower manifold assembly aperture 26. Due to prolonged engine vibrations and exposure to engine fluids, the plurality of screws 22 can loosen and disengage from the aligned apertures 24, 26 over time, possibly resulting in engine failure. In the preferred embodiment, eight self-tapping screws 22 are employed to fasten the active system body 12 to the lower manifold assembly 14.

An injection-molded retainer 28 is utilized for each self-tapping screw 22 to prevent the screws 22 from loosening and disengaging from the air intake manifold system 10. Each injection-molded retainer 28 is substantially "L-shaped" and includes a retaining portion 30 and a substantially perpendicular attachment portion 32, as illustrated in FIG. 3.

The retaining portion 30 of the retainer 28 includes a substantially hemispherically shaped feature 34. The hemispherical shaped feature 34 is sized and shaped to substantially house the head 36 of the self-tapping screw 18. The retaining portion 30 of the retainer 28 captures the screw 22 to prevent the screw 22 from loosening and disengaging from the air intake manifold 10 system due to engine vibrations.

The attachment portion 32 of the retainer 28 is positioned and secured within a pocket 38 located in the active system body 12 proximate to the active system body aperture 24. As shown in FIG. 3, the dimension A of the attachment portion 32 is approximately 0.15 mm to 0.3 mm larger than the dimension P of the pocket 38.

The attachment portion 32 of the retainer 28 is secured within the pocket 38 by a sonic welding process. After the attachment portion 32 is inserted into the pocket 38, ultrasonic energy is applied to the upper surface 40 of the retainer 28, slightly melting the outer surface 44 of the attachment portion 32. A weld interference is created between the attachment portion 32 and the pocket 38, securing the retainer 28 within the pocket 38.

After the attachment portion 32 of the retainer 28 is positioned and secured within the pocket 38 of the active system body 12, the retaining portion 30 substantially covers and houses the head 36 of the self-tapping screw 22. The retaining portion 30 prevents the screws 22 from loosening and falling out of the air intake manifold system 10 due to vibrations and exposure to engine fluids, reducing the likelihood of damage to the engine.

There are several advantages to utilizing a self-tapping screw retainer 30 on an air intake manifold system 10. For one, it is possible to visually check for the presence of the retainer 30. Additionally, the sonic welding process creates superior pull out strength and high resistance to vibrations.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A screw retainer utilized on an air intake manifold assembly comprising:

an attachment portion secured within a pocket of said air intake manifold assembly; and a retaining portion to prevent a screw from disengaging from said air intake manifold assembly.

2. The screw retainer as recited in claim 1 wherein said retainer is injection molded.

3. The screw retainer as recited in claim 1 wherein said retaining portion is substantially perpendicular to said attachment portion.

4. The screw retainer as recited in claim 1 wherein said retaining portion includes a surface substantially shaped and sized to house a head of said screw.

5. The screw retainer as recited in claim 4 wherein said surface is substantially hemispherically shaped.

6. The screw retainer as recited in claim 1 wherein said attachment portion is secured within said pocket by ultrasonic energy creating a weld interface between said attachment portion and said pocket.

7. The screw retainer as recited in claim 6 wherein a width of said attachment portion is greater than a pocket width of said pocket.

8. The screw retainer as recited in claim 6 wherein said width of said attachment portion is between 0.15 mm and 0.3 mm larger than said pocket width of said pocket.

9. An air intake manifold assembly comprising:

a manifold lower assembly having a plurality of manifold apertures;

an active system body having a plurality of body apertures;

a plurality of screws inserted into said aligned plurality of manifold apertures and said plurality of body apertures to attach said manifold lower assembly to said active system body;

a screw retainer utilized on each of said plurality of screws including an attachment portion secured within a pocket of said air intake manifold and a retaining portion to prevent said plurality screw from disengaging from said air intake manifold assembly.

10. The air intake manifold assembly as recited in claim 9 wherein said retainer is injection molded.

11. The air intake manifold assembly as recited in claim 9 wherein said retaining portion is substantially perpendicular to said attachment portion.

12. The air intake manifold assembly as recited in claim 9 wherein said retaining portion includes a surface substantially shaped and sized to house a head of said screw.

13. The air intake manifold assembly as recited in claim 12 wherein said surface is substantially hemispherically shaped.

14. The air intake manifold assembly as recited in claim 9 wherein said attachment portion is secured within said pocket by ultrasonic energy creating a weld interface between said attachment portion and said pocket.

15. The air intake manifold assembly as recited in claim 14 a width of said attachment portion is greater than a pocket width of said pocket.

16. The air intake manifold assembly as recited in claim 14 wherein said width of said attachment portion is between 0.15 mm and 0.3 mm larger than said pocket width of said pocket.

* * * * *